(12) United States Patent
Köder et al.

(10) Patent No.: US 6,293,243 B1
(45) Date of Patent: Sep. 25, 2001

(54) SHORT-STROKE INTERNAL COMBUSTION ENGINE

(75) Inventors: Ingo Köder, Stuttgart; Horst Otterbach, Waiblingen; Michael Brunner, Remshalden, all of (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 09/473,580

(22) Filed: Dec. 28, 1999

(30) Foreign Application Priority Data

Dec. 28, 1998 (DE) ............................................... 198 60 392
Nov. 4, 1999 (DE) ............................................... 199 53 126

(51) Int. Cl.[7] .............................. F02B 75/06; F02B 75/32
(52) U.S. Cl. ..................................... 123/192.2; 123/197.4
(58) Field of Search ............................. 123/197.1, 197.3, 123/197.4, 192.2; 74/405, 595, 603, 596, 597, 598

(56) References Cited

U.S. PATENT DOCUMENTS

| | | | |
|---|---|---|---|
| 3,626,786 | * 12/1971 | Kinoshita et al. | 123/197.4 |
| 4,004,469 | * 1/1977 | Kosugi | 74/604 |
| 4,015,908 | * 4/1977 | Ashley | 403/274 |
| 4,356,741 | * 11/1982 | Schopf et al. | 74/595 |
| 4,641,546 | * 2/1987 | Mettler | 74/598 |
| 4,867,007 | * 9/1989 | Krotky | 74/595 |
| 4,881,427 | * 11/1989 | Yasutake | 74/603 |
| 5,088,345 | * 2/1992 | Kemmler et al. | 74/598 |
| 5,203,230 | * 4/1993 | Distelrath | 74/595 |
| 5,215,051 | * 6/1993 | Smith | 123/197.4 |
| 5,333,580 | * 8/1994 | Hopkins | 123/185.3 |
| 5,343,777 | * 9/1994 | Wood et al. | 74/598 |
| 6,164,159 | * 12/2000 | Saker | 74/598 |

* cited by examiner

Primary Examiner—Noah P. Kamen
Assistant Examiner—Hai Huynh
(74) Attorney, Agent, or Firm—R. W. Becker & Associates; R. W. Becker

(57) ABSTRACT

An internal combustion engine for a work tool has a cylinder with a combustion chamber. A piston is reciprocatingly mounted in the cylinder and delimits the combustion chamber. The crankshaft has bearing pins and at least one crank web. The bearing pin has a mounting end, and the crank web has a first receiving bore and a second receiving bore. The mounting end of the bearing pin is mounted in the first receiving bore. A crankcase is provided in which the crankshaft is rotatably mounted by the bearing pins. The crankshaft has a crank pin with a mounting end that is mounted in the second receiving bore of the crank web. A connecting rod has a first end connected to the piston and a second end connected to the crank pin. The crank pin has a longitudinal center axis and the crankshaft has an axis of rotation extending parallel to the longitudinal center axis. The longitudinal center axis and the axis of rotation are spaced at a stroke spacing from one another. The stroke spacing is identical to or smaller than the sum of the bearing pin radius of the mounting end of the bearing pin and a crank pin radius of the mounting end of the crank pin. The bearing pin radius and the crank pin radius are measured in the plane of the crank web.

11 Claims, 4 Drawing Sheets

SHORT-STROKE INTERNAL COMBUSTION ENGINE

BACKGROUND OF THE INVENTION

The present invention relates to an internal combustion engine for a work tool, especially for a portable work tool, such as a motor chainsaw, etc. wherein the internal combustion engine is comprised of a cylinder having a combustion chamber and a reciprocating piston moving in the cylinder. The piston is connected by a connecting rod to the crankshaft of the engine which is rotatably mounted in a crankcase. The crankshaft has at least one bearing pin with a mounting end that is secured in a receiving bore of a crank web, and the assembled crankshaft is rotatably supported by the bearing pin in the crankcase. The connecting rod is connected to the crank pin which is mounted with its mounting end in a further receiving bore of the crank web. The longitudinal center axis of the crank pin is arranged at a stroke spacing to the parallel extending rotational axis of the crankshaft.

An internal combustion engine suitable for hand-held portable work tools is especially a single cylinder two-stroke engine which is of a simple design and provides a minimal weight in comparison to its output. Due to the size of the work tool it must be ensured that the internal combustion engine requires only a minimal mounting space so that the work tool is of a small size and can be easily manipulated.

Because of more favorable exhaust gas behavior, single cylinder four-stroke motors are also becoming more popular in hand-guided, portable work tools wherein the four-stroke motor is of a much larger size because of the intake and exhaust valves and the required valve drives. In order to be able to mount four-stroke motors in portable, hand-guided work tools, a size reduction is required. From U.S. Pat. No. 5,207,120 an assembled crankshaft for an internal combustion engine is known in which the crank pins and the bearing pins are positive-lockingly secured by press fit in the crank webs. The mounting ends of the crank pins and bearing pins have a smaller diameter than the hardened regions of its running surfaces. The resulting step in the diameter is mechanically greatly stressed and must therefore be properly sized. This results in a stroke spacing between the longitudinal center axis of the crank pin and of the rotational axis of the crankshaft that cannot be reduced.

It is therefore and object of the present invention to provide an internal combustion engine of the aforementioned kind for small-sized work tools having a constructive length in the direction of the vertical cylinder axis that is reduced as much as possible.

SUMMARY OF THE INVENTION

According to the present invention, this is solved in that the stroke spacing is substantially identical or smaller than the sum of the radii of the mounting ends of the crank pin and the bearing pin measured in the plane of the crank web.

Inventively, the stroke spacing is identical to and preferably smaller, than the sum of the radii of the mounting ends of the crank pin and the bearing pin when measured in the plane of the crank web so that the total stroke of the piston is reduced. Accordingly, the size of the cylinder can be reduced. The required displacement can be realized by enlarging the bore diameter of the combustion chamber so that, despite the stroke reduction, the displacement is unchanged.

The reduced stroke spacing is achieved in a crankshaft comprised of individual components such that the circumferential circles of the receiving bores provided within the crank web intercept one another. When the receiving bores are separated from one another by a stay, at least one mounting end is provided with a flattened portion, especially a flat surface which rests without play at the counter abutment of the stay. The flattened portion is provided preferably at the mounting end of the bearing pin of the crankshaft so that the required fixed connection to the crank web can be simply realized with positive-locking engagement.

When the receiving bores are connected to one another (communicate with one another) within the interception area, a substantially Figure 8-shaped opening is provided within the crank web. This makes it possible to secure positive-lockingly the mounting ends of the bearing pin and of the crank pin relative to the crank web or relative to one another. This positive-locking engagement fixedly secures the bearing pin and the crank pin within the crank web. In this manner it is also possible to distribute great drive output securely onto the crankshaft.

The material of the crank web itself no longer must provide the rotationally fixed connection for the drive forces but must only provide simple securing forces for the positive-lockingly arranged mounting ends of the bearing pin and of the crank pin by acting as a securing bracket. Accordingly, it is possible to employ a material of reduced quality for the crank web. It must only have a sufficient load capability, respectively, stiffness in order to act as a bracket.

The inventive design of the crankshaft allows stamping of the crank web itself and also of the receiving openings for the mounting ends of the bearing pin and the crank pin.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 7.

Figure 1:
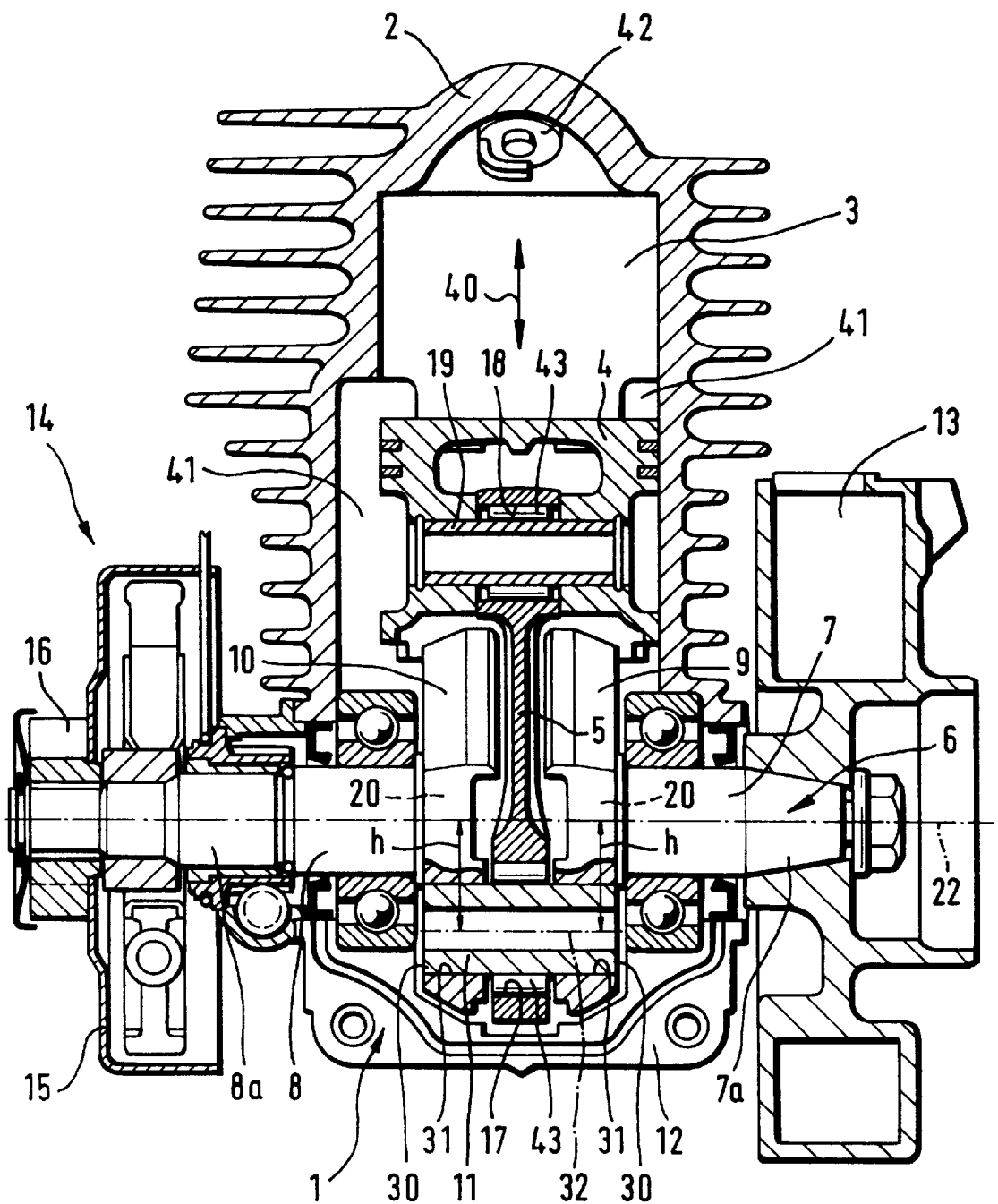
FIG. 1 shows a schematic sectional view of the internal combustion engine of the present invention.

The inventive design of a crankshaft for providing a short stroke will be explained in the following with the embodiment of a single cylinder two-stroke internal combustion engine 1 represented in FIG. 1. The inventive short-stroke crankshaft can also be used in connection with four-stroke motors and is suitable especially as a drive motor for work tools, for example, a motor chainsaw, a cutter, a trimmer, a blower, a hedge trimmer, etc.

The internal combustion engine 1 has a cylinder 2 in which a combustion chamber 3 is formed. The combustion chamber 3 is delimited by a reciprocating piston 4 that is connected by a connecting rod 5 to the crankshaft 6. In the shown embodiment, the crankshaft 6 is comprised of five constructive components, i.e., the cylindrical bearing pins 7, 8 at its ends, the crank webs 9, 10, and the crank pin 11 positioned between the crank webs 9 and 10. The crank pin 11 as well as the bearing pins 7, 8 are cylindrical. The crankshaft 6 is rotatably supported via the bearing pins 7 and 8 in the crankcase 12 wherein the end 7a of the bearing pin 7 projecting from the crankcase supports a blower wheel 13 and the opposite end 8a of the bearing pin 8 projecting from the crankcase 12 supports a centrifugal clutch 14. The centrifugal clutch 14 has an outer coupling drum 15 that, in the shown embodiment according to FIG. 1, is provided with a chain wheel 16 for driving a tool, i.e., a saw chain. The drum 15 and the chain wheel 16 are fixedly connected to one another. The crank pin 11 penetrates the large connecting rod eye 17 of the connecting rod 5. The opposite end of the connecting rod 5 is provided with a small connecting eye 18 that receives a pin 19 with which the connecting rod 5 is pivotably connected to the piston 4. The mounting ends 20 of the bearing pins 7 and 8 of the assembled crankshaft engage fixedly the crank webs 9 and 10. The crank pin 11 is arranged with a corresponding mounting end 30 in correlated receiving bores 31 of the crank webs 9 and 10. The rotational axis 22 of the crankshaft 6 is positioned parallel to the longitudinal center axis 32 of the crank pin 11. As can be seen in FIG. 1, the longitudinal center axis 32 of the crank pin 11 and the rotational axis 22 of the crankshaft 6 extend parallel to one another and at a stroke spacing h which is disclosed and described in more detail in connection with FIGS. 2 and 3.

The piston 4 moves reciprocatingly within the region indicated by the double arrow 40. When moving in the upward direction, an air/fuel/lubricant mixture is sucked into the crankcase via a non-represented carburetor. The down movement of the piston 4 pushes the mixture within the crankcase 12 via the overflow channels 41 into the combustion chamber 3, and the subsequent upward movement of the piston 4 compresses the mixture and ignites it by the spark plug 42. In the subsequent working stroke the piston 4 moves downwardly, and fresh mixture flows via the overflow channels 41 into the combustion chamber 3 and flushes out the exhaust gases so that the combustion chamber 3 is prepared for the following compressing and igniting stroke.

In order to prevent frictional losses, needle bearings 43 are provided in the connecting rod eyes 17 and 18.

Figure 3:
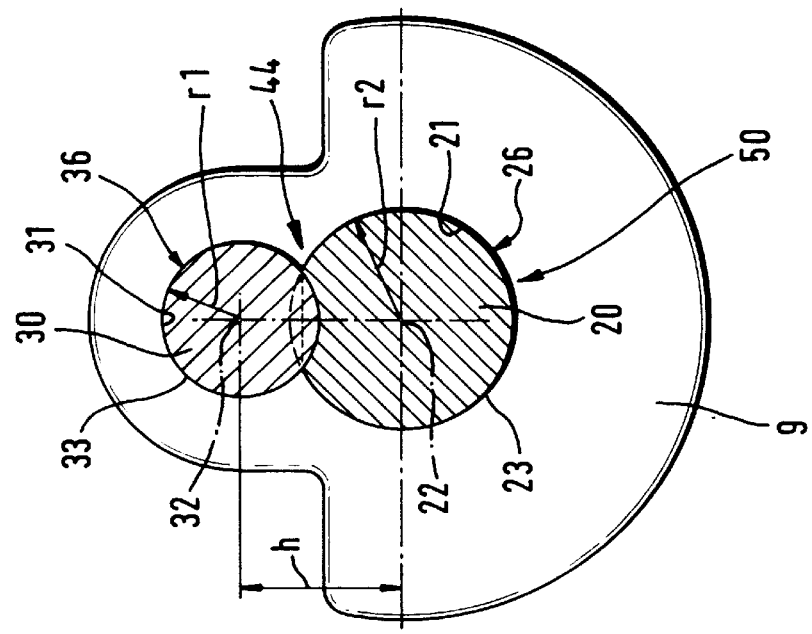
FIG. 3 is a side view of the crank web of the crankshaft viewed in the direction of line III—III of FIG. 2.
Figure 2:
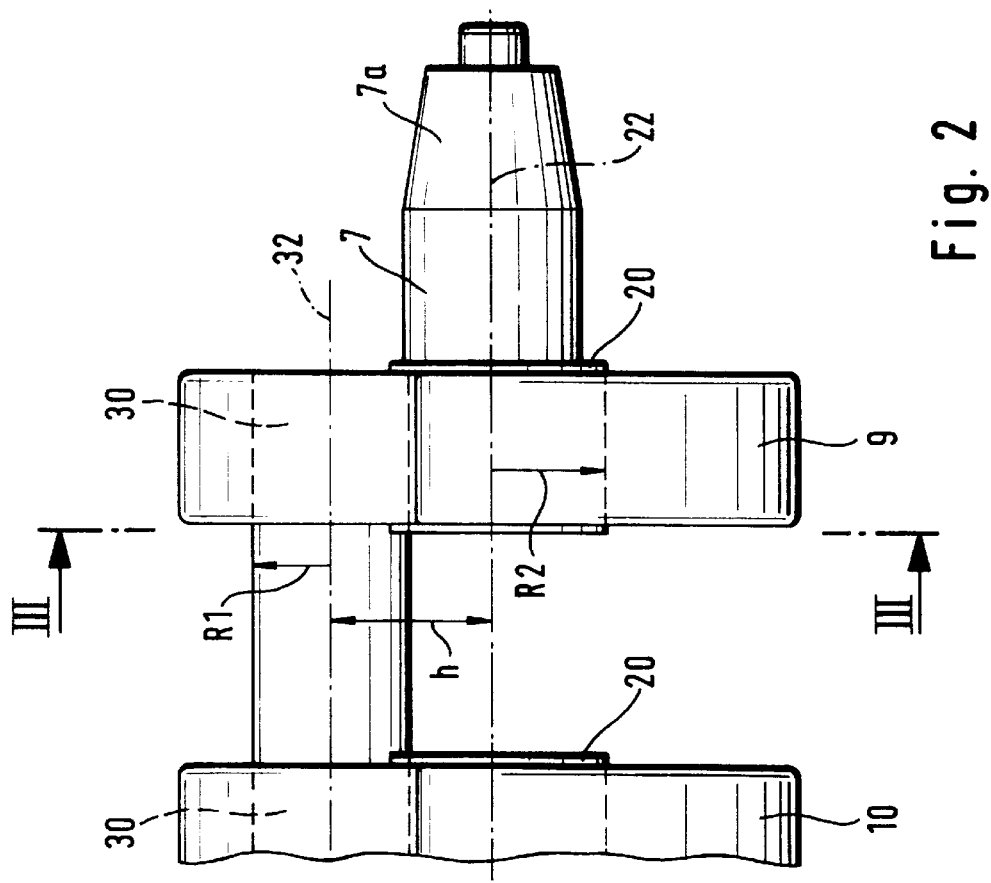
FIG. 2 shows schematically in a side view the design of the inventive crankshaft.

As is shown in detail in FIGS. 2 and 3, the stroke spacing h is selected such that it is preferably identical to and especially smaller than the sum of the radii r1 and r2 of the mounting end 30 of the crank pin 11 in the crank web 9 and of the mounting end 20 of the bearing pin 7 in the same crank web 9. For internal combustion engines of a size to be used in portable work tools, a tolerance of approximately 1 mm between the sum of the radii r1 and r2 and the stroke spacing h is possible. For an assembled crankshaft 6 the stroke spacing h can therefore be smaller than the sum r1 plus r2 of the circumferential circles 26, 36 of the receiving bores 21 and 31. The radii are measured in the plane of the crank web 9 or 10 wherein the radius r1 of the receiving bore 31 for the cylindrical mounting end 30 of the bearing pin 11 is smaller than the radius r2 of the cylindrical mounting end 20 of the bearing pins 7 or 8.

As is shown in particular in FIG. 3, the spacing of the rotational axis 22 of the crankshaft 6 to the longitudinal center axis 32 of the crank pin 11 is identical to the stroke spacing h. The total stroke of the piston 4 for one revolution of the crankshaft 6 in the direction of the double arrow 40 corresponds to double the stroke spacing h of the axis of rotation 22 to the longitudinal center axis 32 of the crank pin 11.

For a crankshaft 6 which is assembled of five components (bearing pins 7, 8; crank pin 11; crank webs 9,10) a minimal stroke spacing h can be achieved in that the circumferential circles 26, 36 of the receiving bores 21, 31 for the mounting ends 20 and 30 of the pins 7, 8 and 11 intercept one another. When the receiving bores 21, 31 are connected to one another, a Figure 8-shaped opening 50 will result which can be produced easily by stamping. The crank web 9 is thus produced together with the Figure 8-shaped opening 50 as a stamped part.

When mounting the assembled crankshaft 6, it must be ensured that the bearing pins 7, 8 are rotationally fixed to the crank web 9. This is advantageously achieved in one of the shown embodiments in that the mounting ends 20 and 30 will engage one another. The connection is expediently embodied as a form-locking (positive-locking) design. The crank webs 9 or 10 engage thus the mounting ends 20 and 30 of the bearing pins 7, 8 and of the crank pin 11 and secure them against falling out in the axial direction. The crank web 9 or 10 therefore must not provide the fixed connection. This fixed connection is ensured by the positive-locking engagement of the mounting ends 20, 30.

Figure 4:
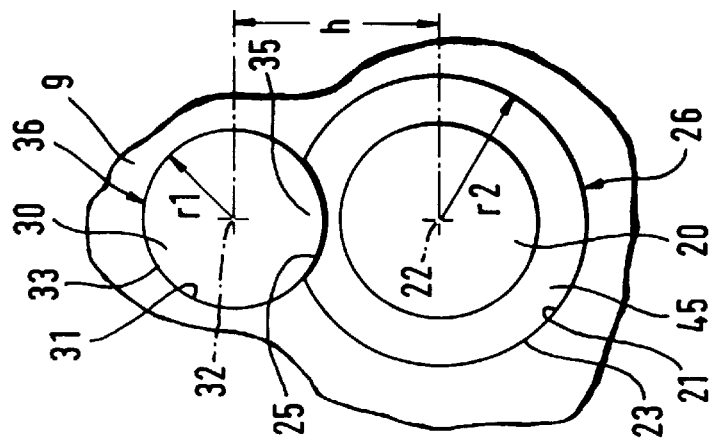
FIG. 4 is a schematic representation of the arrangement of the mounting ends of the crank pin and the bearing pin within the crank web.

As shown in FIG. 4, in a first embodiment each mounting end 20, 30 is inserted into a correlated receiving bore 21, 31 whereby the mounting ends in the area of interception 44 of the receiving bores contact one another without play. For this purpose, at the circumference 23 of the mounting end 20 the bearing pin 9, 10 is provided with a flattened portion 24 and the circumference 33 of the mounting end 30 of the crank pin 11 is provided with a flattened portion 34. Both portions 24, 34 extend in the axial direction at least over the length of axial insertion of the mounting end 20, 30. Because the flattened portions 24, 34 of the mounting ends 20, 30 rest against one another, they are fixedly secured in the receiving bores 21, 31 of the crank webs 9, 10.

Figure 5:
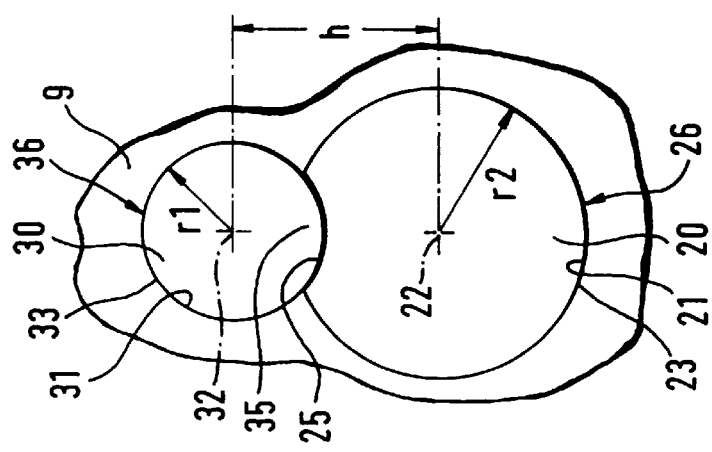
FIG. 5 shows in a schematic representation another arrangement of the mounting ends of the crank pin and of the bearing pin in the crank web.

In the embodiment according to FIG. 5, one of the mounting ends 30 extends radially into the receiving bore 21 of the other mounting end 20. At the circumference 23 of the other mounting end 20 a cutout 25 is provided which receives the projecting portion 35. To realize this, the mounting end 30 of the crank pin 11 is expediently embodied as a complete circular cross-section and a matching circular cutout (circular segment) 25 is provided at the circumference of the other mounting end 20 of the bearing pins 7, 8. The circular cutout 25 extends in the axial direction of the other mounting end 20 over its entire length and receives the projecting circumferential portion of the one mounting end 30.

In FIG. 5 the cutout 25 is provided at the mounting end 20 of the bearing pins 7, 8. As shown in dashed lines in FIG. 3, the cutout can also be provided at the mounting end 30 of the crank pin 11 so that the mounting end 20 of the bearing pins 7, 8 is then embodied with a complete circular cross-section.

Figure 6:
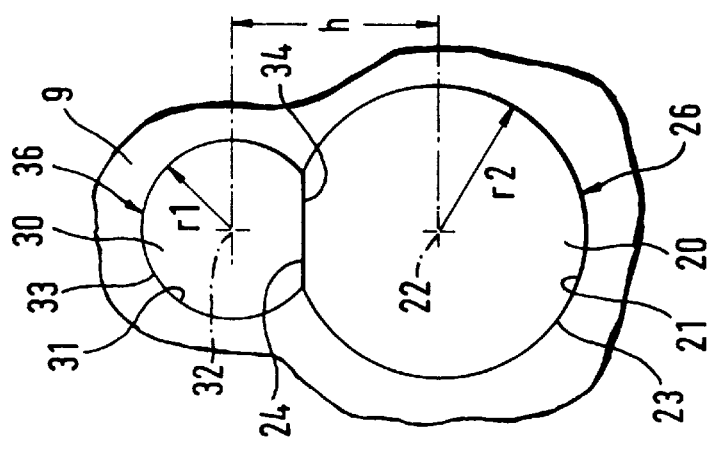
FIG. 6 shows in a schematic representation the arrangement of a crank pin and of a bearing pin in the crank web with positioning of an intermediate ring.

In order to simplify manufacture of the bearing pins 7, 8 for the crankshaft 6, it is suggested to embody them over the entire length with a substantially uniform diameter, as indicated in dashed lines in FIG. 2. For mounting such straight (non-stepped) bearing pins 7, 8 in the receiving bore 21, an intermediate ring 45 is preferably used in the receiving bore 21, as shown in FIG. 6. The intermediate ring 45 is secured on the mounting end 20 of the crank pin 7, 8 so as to be prevented from rotation relative thereto, for which purpose, for example, a key connection is provided. At the circumference 33 of the intermediate ring 45 a cutout 25 for the projecting portion 35 of the mounting end 30 of the crank pin 11 is provided to accommodate the portion 35 projecting into the receiving bore 21. In the same manner as represented in FIG. 4, the intermediate ring 45 can also have a flattened portion.

Figure 7:
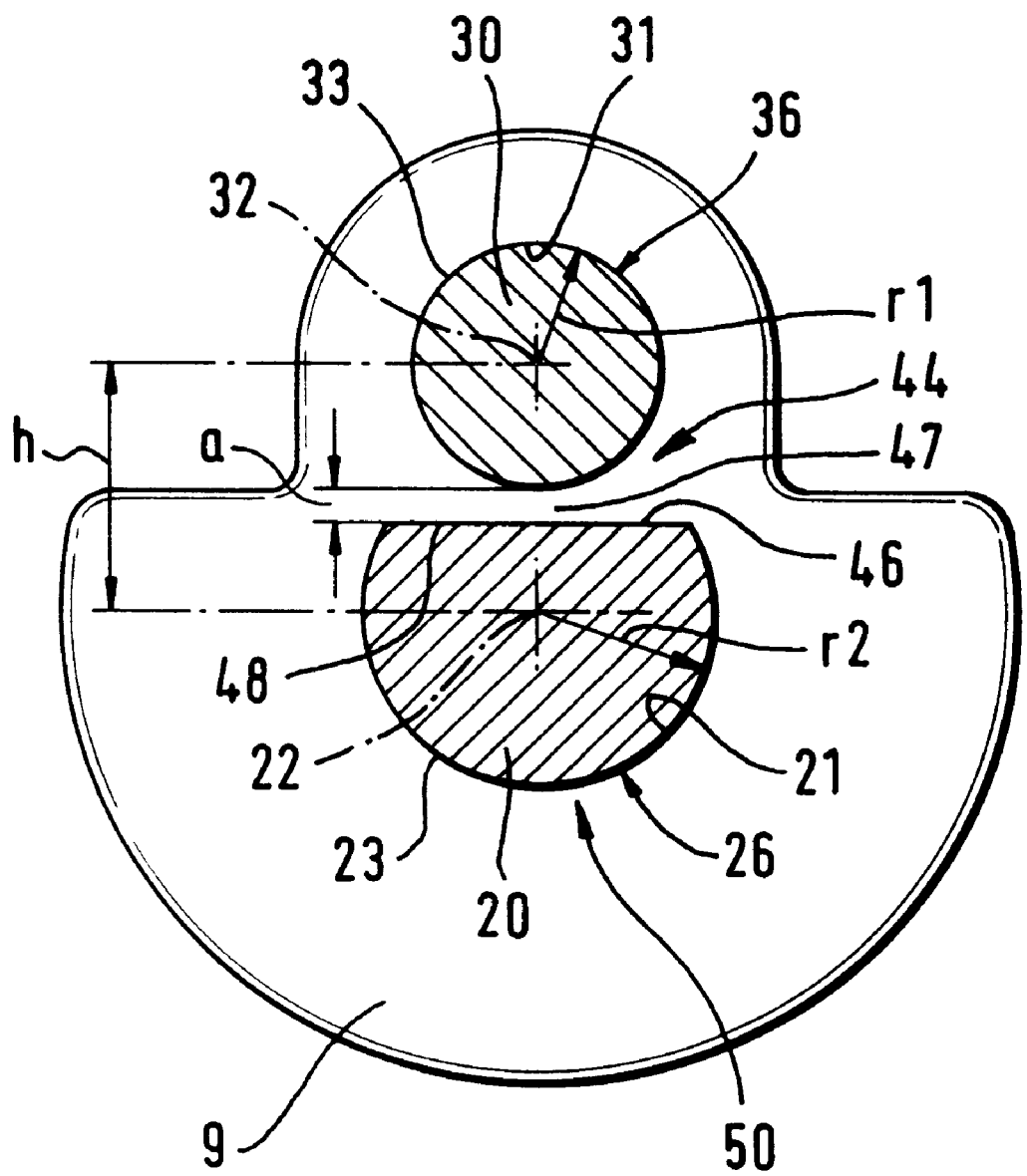
FIG. 7 shows a side view onto a crank web with a stay positioned between the receiving bores.

In the embodiment according to FIG. 7, the receiving bores 21, 31 are separated from one another by a stay 47 wherein a receiving bore 31 is exactly cylindrical and the other receiving bore 21 is flattened by the stay 47. The longitudinal side 48 delimiting the stay 47 is a secant to the circumferential circle 26 of the receiving bore 21. It provides a counter abutment for the flattened portion 46 on the cylindrical circumference of the mounting end 20 of the bearing pin 7. The mounting end 20 is positioned with its flattened portion 46 without play at the counter abutment 48 so that a rotationally fixed connection to the crank web 9 and thus to the crank pin 11 is produced. The flattened portion 46 which defines a flat planar surface at the mounting end 20 of the bearing pin 7 effects with the counter abutment at the stay 47 the form-locking (positive-locking) connection in the rotational direction so that the crank web has substantially a bracing function.

The surface 46 is positioned parallel to the axis of rotation 22 of the crankshaft and perpendicularly to the stroke spacing h. Between the surface 46 of the mounting end 20 and the circumference of the mounting end 30 of the crank pin 11 a spacing a is formed in the mounted state of the crankshaft 6. The spacing a matches the minimal width of the stay 47.

The specification incorporates by reference the disclosure of German priority documents 198 60 392.4 of Dec. 28, 1998, and 199 53 126.9 of Nov. 4, 1999.

The present invention is, of course, in no way restricted to the specific disclosure of the specification and drawings, but also encompasses any modifications within the scope of the appended claims.

What is claimed is:

1. An internal combustion engine for a work tool, said internal combustion engine comprising:
   a cylinder (2) having a combustion chamber (3);
   a piston (4) reciprocatingly mounted in said cylinger (2) and having an end face delimiting said combustion chamber (3);
   a crankshaft (6) comprising at least one bearing pin (7, 8) and at least one crank web (9, 10), wherein said at least one bearing pin (7, 8) has a mounting end (20) and wherein said at least one crank web (9, 10) has a first receiving bore (21) and a second receiving bore (31), wherein said mounting end (20) of said at least one bearing pin (7, 8) is mounted in said first receiving bore (21);
   a crankcase (12) in which said crankshaft (6) is rotatably mounted via said at least one bearing pin (7, 8);
   said crankshaft (6) having a crank pin (11) wit h a mounting end (30), wherein said mounting end (30) of said crank pin (11) is mounted in said second receiving bore (31) of said at least one crank web (9, 10);
   a connecting rod (5) having a first end connected to said piston (4) and a second end connected to said crank pin (11);
   said crank pin (11) having a longitudinal center axis (32) and said crankshaft (6) having an axis of rotation (22) extending parallel to said longitudinal center axis (32), wherein said longitudinal center axis (32) and said axis of rotation (22) are spaced at a stroke spacing (h) from one another;
   said stroke spacing (h) is identical to or smaller than a sum of a bearing pin radius (r2) of said mounting end (20) of said at least one bearing pin (7, 8) and a crank pin radius (r1) of said mounting end (30) of said crank pin (11), wherein said bearing pin radius (r2) and said crank pin radius (r1) are measured in a plane of said at least one crank web (9, 10);
   said mounting ends (20, 30) of said at least one bearing pin (7, 8) and said crank pin (11) each have a circumferential contour with an axially extending flattened portion (24, 34) at a location of interception of said first and second receiving bores (21, 31), said axially extending flattened portions (24, 34) positive-lockingly matching one another, and wherein said first and second receiving bores (21, 31) are stamped simultaneously with said crank web (9, 10).

2. An internal combustion engine according to claim 1, wherein circumferential circles (26, 36) of said first and second receiving bores (21, 31) described by said first and second radii (r1, r2) intercept one another.

3. An internal combustion engine according to claim 2, wherein said first and second receiving bores (21, 31) are separated by a stay (47) of said at least one crank web (9, 10).

4. An internal combustion engine according to claim 3, wherein at least one of said mounting ends (20, 30) of said bearing pin (7, 8) and said crank pin (11) mounted in said at least one crank web (9, 10) has a flattened circumferential portion (46) resting at said stay (47).

5. An internal combustion engine according to claim 4, wherein said flattened circumferential portion (46) is located at said mounting end (30) of said crank pin (11).

6. An internal combustion engine according to claim 4, wherein said flattened circumferential portion (46) is a flat planar surface.

7. An internal combustion engine according to claim 2, wherein said first and second receiving bores (21, 31) open into one another at a location of interception and wherein said mounting ends (20, 30) of said at least one bearing pin (7, 8) and said crank pin (11) are configured to positive-lockingly engage one another.

8. An internal combustion engine according to claim 7, wherein one of said mounting ends (30, 20) radially projects into said receiving bore (21, 31) of the other one of said mounting ends (30, 20) and wherein said other mounting end (20, 30) has a receiving cutout (25) into which said one mounting end (30, 20) radially projects.

9. An internal combustion engine according to claim 8, wherein said receiving cutout (25) is located in mounting end (20) of said bearing pin (7, 8).

10. An internal combustion engine according to claim 8, wherein said one mounting end (30) has a complete circular cross-section and wherein said receiving cutout (25) is a circular segment matching said circular cross-section.

11. An internal combustion engine according to claim 1, further comprising an intermediate ring (45) positioned between said mounting end (30) of said at least one bearing pin (7, 8), wherein said intermediate ring (45) is fixedly connected to said at least one bearing pin (7, 8).

* * * * *